United States Patent [19]
Garrett

[11] 4,138,330
[45] Feb. 6, 1979

[54] LIQUID TREATMENT

[75] Inventor: Michael E. Garrett, Woking, England

[73] Assignee: Boc Limited, London, England

[21] Appl. No.: 779,747

[22] Filed: Mar. 21, 1977

[30] Foreign Application Priority Data
Apr. 14, 1976 [GB] United Kingdom ............... 15422/76

[51] Int. Cl.² ........................... B01F 3/04; C02B 1/34
[52] U.S. Cl. .............. 210/63 R; 261/119 R; 261/DIG. 75; 210/205; 210/218
[58] Field of Search .......... 210/15, 63 R, 188, 198 R, 210/205, 209, 218, 219, 222, 258; 261/DIG. 75, 119 R, 121 R

[56] References Cited
U.S. PATENT DOCUMENTS

| 3,738,620 | 6/1973 | Ennis ................................. 261/121 R |
| 3,933,640 | 1/1976 | Kirk et al. ............................ 210/220 |
| 3,983,031 | 9/1976 | Kirk ....................................... 210/15 |

*Primary Examiner*—Thomas G. Wyse
*Attorney, Agent, or Firm*—Dennison, Dennison, Meserole & Pollack

[57] ABSTRACT

Apparatus and method for dissolving gas in a body of liquid comprising a gas/liquid contactor device having a plurality of discrete conduit sections of different cross-sectional area connected in series or in parallel.

A stream of liquid is passed through the device and gas is introduced into the stream upstream of the device to establish a turbulent gas/liquid contact zone in at least one of the conduit sections.

The liquid stream with gas dissolved in it is introduced into the main body of liquid.

10 Claims, 3 Drawing Figures

LIQUID TREATMENT

FIELD OF THE INVENTION

This invention relates to treating liquids by dissolving gas therein. The invention is particularly but not exclusively, suitable for dissolving gas, for example oxygen enriched gas or carbon dioxide, in water, which may or may not have a biochemical oxygen demand.

BACKGROUND TO THE INVENTION

In many sewage works there is a large variation in the flow throughout the day, often a 12:1 ratio, and it is not unusual for the pollution load to vary proportionately with the flow. If the sewage works is to be operated with a constant dissolved oxygen concentration in the activated sludge tanks, it follows that the rate of oxygen addition must be capable of being varied in the same ratio throughout the 24 hour period. It is therefore advantageous for any device used for dissolving oxygen in the sewage to be capable of this kind of flexibility. It has been proposed to dissolve gas in an open body of liquid by injecting gas in a flow of the liquid passed through a downwardly divergent conduit which opens into the body of the liquid with the bubbles of injected gas dissolving to some extent in the liquid as it passes through the conduit.

These proposals however have required that the buoyant velocity of the bubbles of gas in the conduit is always less than that of the flow of liquid through the conduit so that there is no pocket of undissolved gas formed at the upper end of the conduit. However, the larger size of gas bubbles which are bound to be created, for example by coalescence of a number of bubbles formed in the downwardly flowing stream of liquid in the conduit, will rise upwardly in the conduit to its upper end. The applicants have found that in such a method where the incoming liquid falls through a clearly defined and relatively still gas pocket at the top of the conduit, the amount of oxygen in the solution is relatively small. The Applicants have now discovered that by maintaining a turbulent gas/liquid contact zone in the conduit considerably higher oxygen transfer rates can be achieved. Indeed the Applicants have discovered that if substantially the whole contents of the conduit are frothing very high oxygen transfer rates can be achieved.

A turbulent gas/liquid contact zone can be created by causing the incoming flow of sewage to impinge on the liquid surface in the conduit at a rate to cause the required turbulence to generate bubbles of gas entrained from the pocket of undissolved gas formed above the liquid space in the conduit. It is also thought that the larger size bubbles, of undissolved gas, which is introduced into the stream before it enters the conduit, rise in the liquid in the conduit creating a turbulence of upward and downward currents in the liquid in the conduit thereby greatly extending the gas/liquid contact time.

SUMMARY OF THE INVENTION

According to the invention there is provided a method of dissolving gas in a body of liquid comprising introducing gas into a stream of the liquid and passing the stream and gas therein downwardly through a gas liquid contactor device comprising a plurality of conduit sections of different cross-sectional areas such that, for different ranges of flow rate of the incoming stream, a turbulent gas/liquid contact zone is established in at least one of the conduit sections with the average downward velocity of the down flowing liquid in that section less than the rise velocity of at least the larger sized bubbles produced in the section, the stream and gas dissolved therein being passed from the contactor device to the body of liquid.

The invention also provides apparatus for dissolving gas in a body of liquid, comprising a gas/liquid contactor device having a plurality of discrete conduit sections which have different cross-section areas to one another and are connected in series or in parallel, means for passing a stream of liquid through the contactor and means for introducing gas into the stream of liquid before it passes through any one of the conduit sections. Such an arrangement permits in use a turbulent gas/liquid contact zone to be established in at least one of the conduit sections for different ranges of flow rate of said stream.

Preferably a coalescent zone is provided as part of the gas/liquid contactor device in which a relatively calm, non turbulent, liquid zone exists below the turbulent gas/liquid contact zone. In this zone the relatively small bubbles can coalesce into larger bubbles which rise upwardly by buoyancy into the turbulent zone where shear forces reduce such bubbles once again to smaller bubbles. In the case of a contactor device having conduit sections in series, each zone of larger cross-sectional area immediately below that, in which the turbulent zone exists at the time being, provides the coalescent zone. Below the last conduit section in the series a further conduit section of larger cross-sectional area is preferably provided to act as the coalescent zone for a turbulent zone set up in use in such last conduit section. In the case of a contactor device having conduit sections in parallel, a further conduit section of larger cross-sectional area is preferably provided in series with and immediately below each conduit section.

It is also preferred that a gas collection zone is provided at the upper end of one or more of the conduit sections and means to vent such zone to remove gases stripped from solution.

An advantage of a method and apparatus according to the invention is that gas can be dissolved in liquid by passing it into a main body thereof under conditions which are turbulent and produce high gas transfer rates for a variety of different incoming flow rates of the liquid to be treated. Apart from the activated sludge tank itself there are other areas within the sewage works or elsewhere in which it might be advantageous to add oxygen by a method according to the invention. For example, the addition of oxygen to the sewage going into the primary sedimentation tanks can do much to prevent septicity during its long retention period and may even assist flocculation of the incident bacteria. Similarly, oxygen addition prior to the sewage being distributed to filters may be beneficial. The addition of the equivalent amount of dissolved oxygen to a discharge B.O.D. may effectively prevent any subsequent oxygen sag in the river. Furthermore, in these situations the quantity of oxygen needed to be added is probably likely to be less than the air saturated figure of say, 10 ppm, and therefore a single pass system able to add this concentration of oxygen under varying flow conditions, as achieved by a method and apparatus according to an invention is advantageous. Indeed it might also be possible to dispense with further pumps and to enlist the gravitational head commonly utilised at sewage works.

By using a contactor device having discrete sections of different cross sectional areas, in accordance with the invention, low, intermediate and high flow rates can be passed through the conduit means without loosing the desired turbulent or frothing gas/liquid contact zone. If for example a single section is used and is dimensioned for the lowest flow rate, i.e. in use at this flow rate the turbulence being sufficent to induce the desired frothing, then at increased flow rates the entrained gas will be swept out of the bottom of the contactor device before it has adequately dissolved in the liquid stream and such undissolved gas will pass into the main body of the liquid to rise therethrough and be lost from its surface to atmosphere. If the conduit is of a size to retain the entrained gas at the highest flows, then at reduced flow rates there will be insufficient turbulence created by the incoming stream of liquid to establish the necessary froth regime in the contactor device. By using the method and apparatus according to the invention the required froth regime is set up in one or other sections of the contactor device at the different flow rates.

All said sections of the contactor device may be of constant cross section from top to bottom and typically comprise cylindrical chambers of different diameters.

In one form of apparatus according to the invention said sections are connected to one another to form a continuous vertical conduit having an inlet at its upper end which leads to a section of smallest cross section area which leads in turn to one or more further conduit sections having progressively larger cross section areas. The lower end of the last section of the conduit, which is also the section of the largest cross section area of the conduit, may in use open directly into the main body of water. Such last section may constitute a coalescent zone.

In another form of apparatus according to the invention, each section has an inlet at its upper end and may be in use open at its lower end directly into a a main body of water, there being provided a substantially horizontal pipe connecting the inlets, through which pipe the stream is introduced to one or more of said sections, the pipe leading first to the inlet of section of smallest cross sectional area and then in succession to the inlets of the remaining sections in an order relating to increasing cross sectional area of those sections.

When liquid is fed to the contactor device under gravity it is desirable to provide a liquid seal to maintain at all times the aforesaid pocket of gas at the upper end of the conduit section having the smallest cross sectional area. This liquid seal may comprise a U-bend provided in an inlet pipe for the aforesaid stream of liquid to be fed to the contactor device.

DETAILED DESCRIPTION

Figure 1:
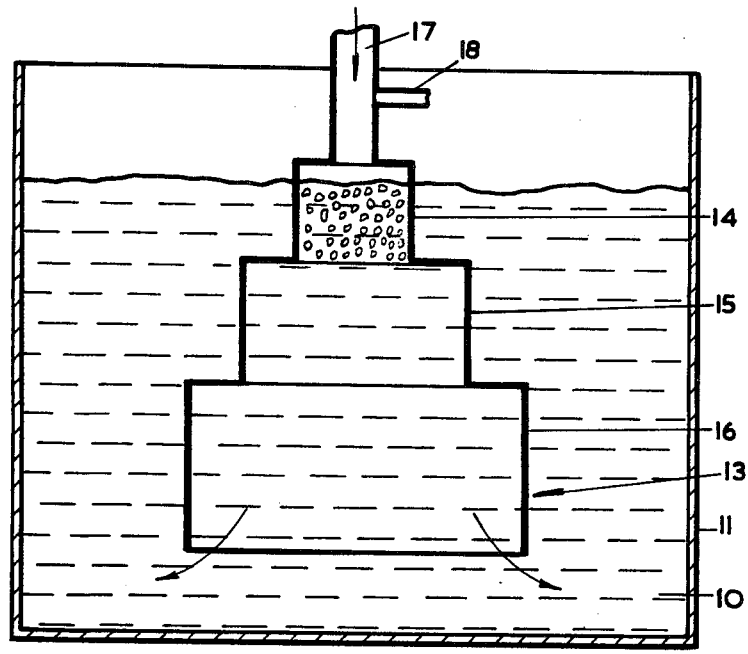
FIG. 1 is a diagrammatic vertical section through one form of apparatus embodying the invention.
Figure 2:
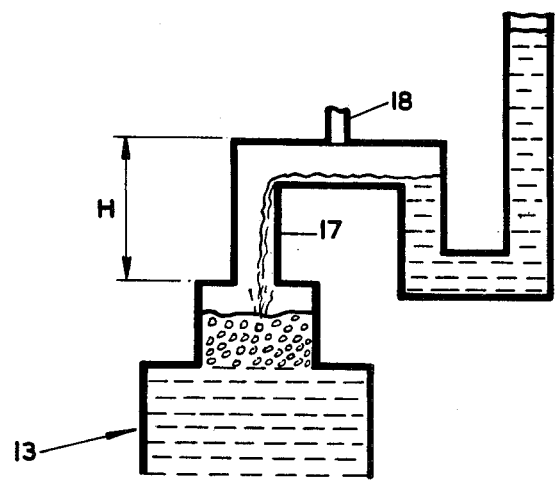
FIG. 2 is a detail of the apparatus of FIG. 1 showing a modification of that embodiment.

Referring to FIGS. 1 and 2 of the drawings, the main body 10 of water having a biological demand is contained in a treatment tank. Incoming water to be treated is passed into the main body of water through a gas/liquid contactor device 13 according to the invention which comprises a vertical conduit having three superimposed cylindrical sections 14, 15 and 16 of different diameters, and an inlet pipe 17 leading to the upper end of the conduit and through which incoming liquid to be treated passes. Oxygen is introduced into the incoming stream through pipe 18. The oxygen may be introduced under pressure into the incoming stream or the pipe 17 may be constricted to form a venturi into which pipe 18 leads so that the oxygen is drawn into the stream as it passes through the venturi.

In operation, a gas pocket is established at the upper end of the device 13 where bubbles of undissolved oxygen, which rise in the conduit, collect with a low flow rate through pipe 17. A gas/liquid interface is established in the conduit section 14 and the velocity of the downstream of liquid in that section is less than the rise velocity of the majority of the bubbles established in the liquid in that section. As described above a turbulent frothing gas/liquid contact zone is established by the incoming flow impinging on the surface of the liquid and entraining the gas from the gas pocket together with the turbulence created by bubbles rising upwardly in the section 14. Turbulence increases the gas/liquid transfer coefficient (Kla) due to the fluctuating pressure which exists and the relatively high relative velocity of the gas and liquid. Any smaller bubbles which leave section 14 are collected in the relatively calm zone at the time being existing in section 15. In the latter zone the bubbles coalesce and rise again into the turbulent regime in zone 14 for further dissolution. When the incoming flow rate increases to a higher range entrained gas bubbles are swept into the section 15 and the frothing gas liquid contact zone is established in that section. Similarly as the flow rate further increases the froth is finally moved into the largest section 13 of the conduit which then contains the turbulent frothing regime. This construction of gas/liquid contactor comprises three parallel sided components mounted one above the other and is a relatively simple construction when manufactured, and under all flow conditions the froth volume is fully defined and contained in one or more sections of the conduit. In a modified embodiment a further larger diameter conduit section is provided beneath section 16 to provide a coalescent zone for a turbulent regime set up in that section.

Referring to FIG. 2 of the drawings there is shown a modified inlet pipe for use with a gravity feed of liquid to the conduit. In this construction the inlet pipe 17 has vertical leg leading to the upper end of the conduit 13 the height of which is H. This vertical leg joins a horizontal section which is connected to a U tube section which constitutes the gas trap. It is important that the liquid entering the conduit should be moving at a sufficient velocity to cause the required turbulence and the length H of the downleg of the pipe 17 must therefore be sufficient to achieve this effect and it can also incorporate a spill lip for the lowest flow rate. The longer leg of the U-section of the pipe 17 must be sufficiently long to counteract the buoyancy pressure generated by the gas/liquid mixture within the conduit 13.

Figure 3:
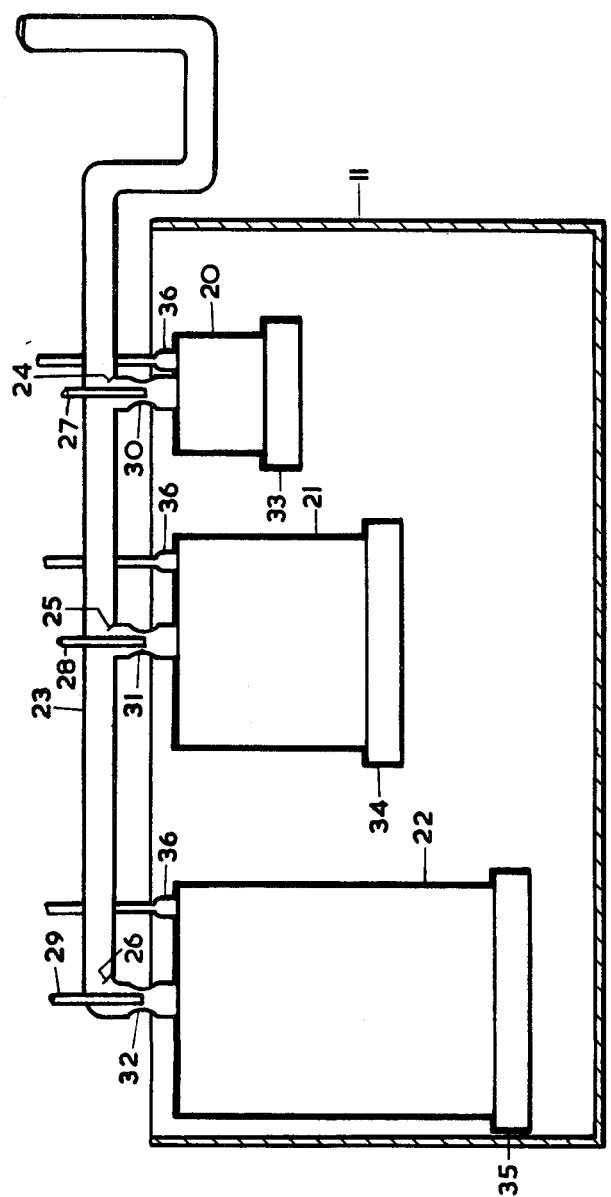
FIG. 3 is a diagrammatic vertical section through the second embodiment of apparatus according to the invention.

The amount of oxygen injected through pipe 18 is controlled automatically so that it remains in the required proportion to the dissolved oxygen concentration of the liquid leaving the conduit such that the rate of oxygen injection is altered when necessary to maintain the dissolved oxygen concentration at a constant Referring to FIG. 3 of the drawings there is shown a second embodiment of an apparatus according to the invention in which three separate conduits sections 20, 21 and 22 are provided. The sections are cylindrical and are mounted in a vertical position side by side in the main body of water with their lower ends open to the body of water. The upper inlet ends of the conduit section 20 to 22 are interconnected by an inlet pipe 23, which leads from a U shaped gas trap first to conduit section 20 and then in turn to sections 21 and 22. In this embodiment the inflowing liquid from a header is diverted by means of shallow weirs 24, 25, 26 into the respective conduit sections. Flow restrictors 30, 31, 32 are provided in respective conduit inlets to control the flow to each conduit to prevent bubbles created in the conduit from being forced out of the conduit. Oxygen introduction pipes 27, 28, 29 lead into the respective conduit inlets. For a low flow through pipe 23 the incoming water is diverted into conduit 22 in which the turbulent gas/liquid contact zone is established. When the flow increases to above a particular value such that the inlet pipe to conduit section 20 is filled, the excess liquid then flows into the next conduit section 21 over weir 25. The cross sectional area of conduit section 21 is such that a turbulent gas/liquid contact zone is also established in that section for the particular incoming flow rate of liquid at which the flow is directed into that section. Finally for a further increase of flow the excess liquid is then diverted to the largest conduit section 21 in which the frothing gas/liquid contact zone is then established. Each conduit section 20, 21, 22 is provided with a large diameter cylindrical conduit 33, 34, 35 respectively which defines a coalescent zone for each section.

A gas collector and valved vent line 36 is provided at the upper end of each conduit section to allow venting of gases stripped from the stream passing through the section.

The amount of oxygen introduced through the individual pipes 27, 28, 29 is controlled by a detector associated with each section 21 22 which determines the dissolved oxygen in the sewage leaving the respective conduit section.

Although the above described embodiments have been directed to the introduction of oxygen into the sewage it is quite possible to dissolve other gases in other liquids using the apparatus and method described for example it is throught possible that carbon dioxide could be dissolved in water not having a biochemical oxygen demand.

What is claimed is:

1. Apparatus for dissolving gas in liquid consisting essentially of a gas/liquid contactor device in the form of a generally vertical conduit, an inlet duct for a liquid stream leading to the upper end of the conduit, and means for introducing gas directly into such a stream before it passes into the conduit, wherein the conduit comprises at least two successive discrete and superimposed sections, the cross-sectional area of each such section being progressively larger than that of the section above or, in the case of the uppermost section, progressively larger than the crosssectional area of said inlet duct, whereby with a selected rate of flow of liquid into the conduit a turbulent gas/liquid zone is established in one of said sections while a coalescence zone is established in the section below so that coalesced bubbles rise from the coalescence zone into the turbulent gas/liquid contact zone while such smaller bubbles are swept from the turbulent gas/liquid contact zone into the coalescence zone below.

2. Apparatus as claimed in claim 1 wherein there is provided means to vent an upper zone of one or more of the conduit section in which zones gas stripped from solution may collect.

3. Apparatus as claimed in claim 1 wherein all said sections of the contactor device are of constant cross section from top to bottom.

4. Apparatus as claimed in claim 3 wherein the sections comprise cylindrical chambers of different diameters.

5. Apparatus as claimed in claim 1 wherein there is provided means to maintain a liquid seal at all times in said inlet duct.

6. Apparatus as claimed in claim 5 wherein the liquid seal is a U-bend provided in said inlet duct.

7. A method of dissolving gas in liquid which consisting essentially of introducing gas directly into a stream of the liquid before passage into a conduit and directing the liquid gas/stream through an inlet duct into the upper end of a gas/liquid contactor device in the form of a generally vertical conduit comprising at least two discrete and superimposed successive sections, the cross-sectional area of each such section being progressively larger than that of the section above or, in the case of the uppermost section, progressively larger than the cross-sectional area of the inlet duct, a turbulent gas/liquid contact zone being established in one of said sections while a coalescence zone is established in the section below, the average downward velocity of the liquid within the coalescence zone being less than the rise velocity of a majority of undissolved gas bubbles swept into that zone from the turbulent gas/liquid contact zone above whereby such bubbles rise and coalesce, and the average downward velocity of the liquid within the turbulent gas/liquid contact zone being less than the rise velocity of coalesced bubbles formed in the zone below but greater than the rise velocity of smaller bubbles produced in the turbulent gas/liquid contact zone whereby such coalesced bubbles rise from the coalescence zone into the turbulent gas/liquid zone while such smaller bubbles are swept from the turbulent gas/liquid contact zone into the coalescence zone below.

8. A method as claimed in claim 7 wherein the upper zone of one or more of the conduit sections is vented periodically, to remove gases stripped from solution.

9. A method as claimed in claim 7 wherein the aforesaid gas is an oxygen-containing gas and the aforesaid liquid is an aqueous material.

10. A method as claimed in claim 9 wherein the oxygen-containing gas is oxygen or a gaseous mixture having an oxygen-content greater than that of air.

* * * * *